(12) United States Patent
Saneecharaun et al.

(10) Patent No.: US 10,001,145 B2
(45) Date of Patent: Jun. 19, 2018

(54) ELECTRO-PNEUMATIC CONVERTER WITH BALANCED FLAPPER

(71) Applicant: Norgren Limited, Staffordshire (GB)

(72) Inventors: Tarik Saneecharaun, West Yorkshire (GB); Pete Olley, West Yorkshire (GB); David Matthew Tompson, West Yorkshire (GB)

(73) Assignee: Norgren Limited, Lichfield, Staffordshire (GB)

( * ) Notice: Subject to any disclaimer, the term of this patent is extended or adjusted under 35 U.S.C. 154(b) by 0 days. days.

(21) Appl. No.: 15/022,683

(22) PCT Filed: Sep. 19, 2014

(86) PCT No.: PCT/GB2014/052855
§ 371 (c)(1),
(2) Date: Mar. 17, 2016

(87) PCT Pub. No.: WO2015/040414
PCT Pub. Date: Mar. 26, 2015

(65) Prior Publication Data
US 2016/0230782 A1   Aug. 11, 2016

(30) Foreign Application Priority Data

Sep. 19, 2013   (GB) .................................. 1316657.4

(51) Int. Cl.
*F15B 5/00* (2006.01)
*G05D 16/20* (2006.01)
*F15B 19/00* (2006.01)

(52) U.S. Cl.
CPC ............ *F15B 5/003* (2013.01); *F15B 19/002* (2013.01); *G05D 16/202* (2013.01); *Y10T 137/2278* (2015.04)

(58) Field of Classification Search
CPC ......... Y10T 137/2278; Y10T 137/2409; Y10T 137/2452; F15B 19/002; F15B 5/003; G05D 16/20; G05D 16/2006; G05D 16/202
USPC ............................ 137/82, 85, 86; 251/78, 80
See application file for complete search history.

(56) References Cited

U.S. PATENT DOCUMENTS 2,753,885 A * 7/1956 White .................... G01F 23/345
                                                           137/414
2,773,685 A * 12/1956 Aagaard .................. G01G 1/00
                                                           137/85
2,837,104 A * 6/1958 Side ........................ F15B 5/003
                                                           137/82

(Continued)

FOREIGN PATENT DOCUMENTS

DE          2744965 A1    4/1979
JP          S5847713 U    3/1983
JP          H0842505 A    2/1996

*Primary Examiner* — William McCalister
(74) *Attorney, Agent, or Firm* — The Ollila Law Group LLC

(57) ABSTRACT

A balance beam electro-pneumatic converter (100, 400) adapted to couple to a conduit with a fluid is provided. The balance beam electro-pneumatic converter (100, 400) includes a nozzle (184) adapted to fluidly couple to the conduit, and a flapper (130) rotatably coupled to the nozzle (184) via a pivot (140) wherein the flapper (130) is adapted to regulate a pressure of the fluid and balance about the pivot (140).

15 Claims, 5 Drawing Sheets

(56) References Cited

U.S. PATENT DOCUMENTS

| | | | | |
|---|---|---|---|---|
| 2,896,655 | A | * | 7/1959 | Hartz ................... G05D 7/005 137/251.1 |
| 2,931,619 | A | * | 4/1960 | Andersson .......... F16K 31/0651 251/129.21 |
| 2,942,581 | A | * | 6/1960 | Gaffney ................... F15B 9/17 137/85 |
| 2,947,284 | A | * | 8/1960 | Nicholson ........... F16K 31/0682 137/237 |
| 2,960,097 | A | | 11/1960 | Scheffler |
| 3,174,498 | A | * | 3/1965 | Joesting ................. F15B 5/003 137/82 |
| 3,245,425 | A | * | 4/1966 | De Meyer .............. F15B 5/003 137/414 |
| 3,586,287 | A | * | 6/1971 | Knobel ............... F16K 31/0651 251/129.21 |
| 3,861,411 | A | | 1/1975 | Mitchell et al. |
| 3,982,562 | A | * | 9/1976 | Pickett ................. F16K 31/105 137/605 |
| 4,172,464 | A | | 10/1979 | Rezendes |
| 4,336,819 | A | * | 6/1982 | Nishihara ................ F15C 3/04 137/82 |
| 4,577,652 | A | * | 3/1986 | Blatner .................... F15C 3/14 137/625.28 |
| 5,257,639 | A | * | 11/1993 | Prescott ................ F15B 5/003 137/82 |
| 5,474,100 | A | * | 12/1995 | Nishijima .......... G05D 16/2013 137/544 |
| 5,493,488 | A | * | 2/1996 | Castle ................... G05B 11/42 137/85 |
| 6,311,951 | B1 | * | 11/2001 | Samulowitz ........ F16K 31/0682 251/129.16 |

\* cited by examiner

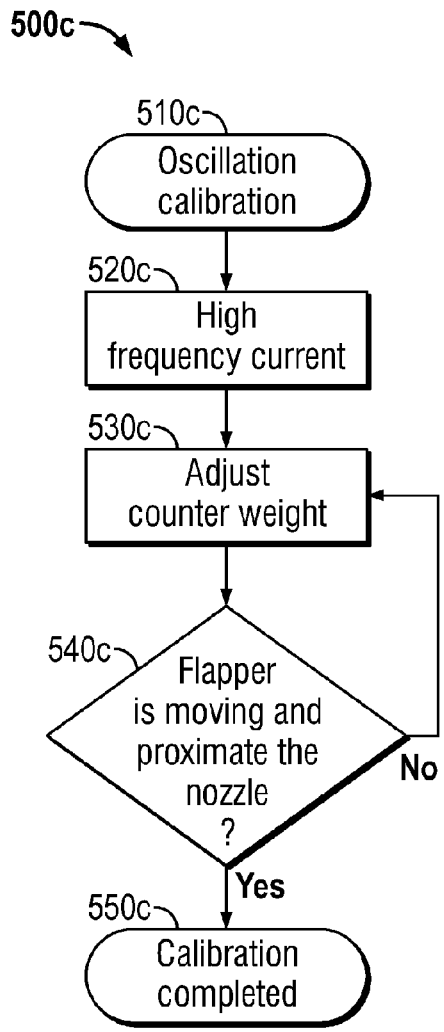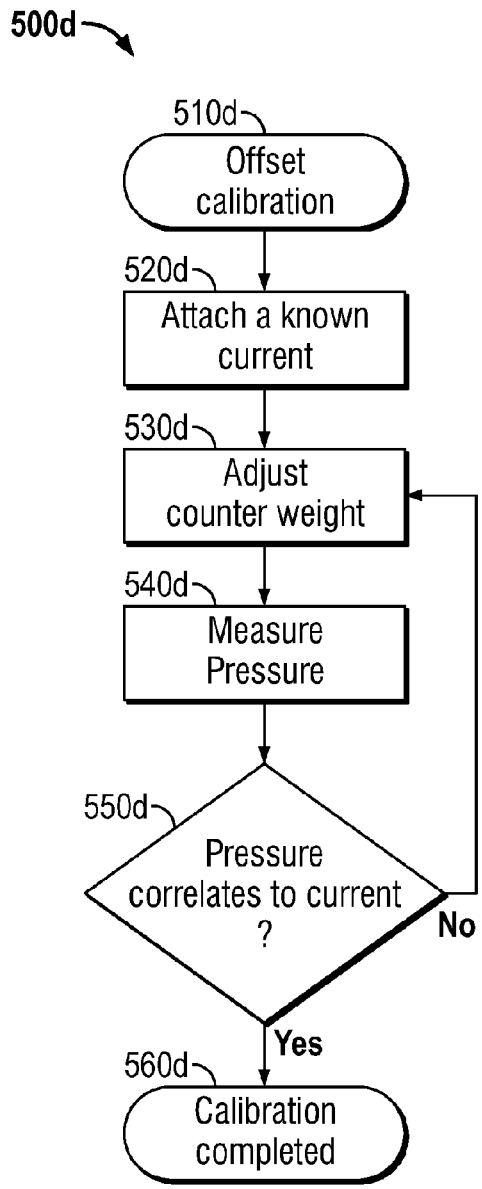
FIG. 5C
FIG. 5D

ELECTRO-PNEUMATIC CONVERTER WITH BALANCED FLAPPER

TECHNICAL FIELD

The embodiments described below relate to, electro-pneumatic converters, and more particularly, to a balance beam electro-pneumatic converter.

BACKGROUND

Electro-pneumatic converters ("I/P converters") use a signal, such as electrical current, to regulate a fluid pressure. The I/P converters may be mounted to a conduit carrying pressurized fluid. The I/P converters may use the signal to change the size of the opening to allow fluid to escape the pipe. Due to the fluid leaving the conduit, the fluid pressure in the conduit may drop to a desired level. The size of the opening, and therefore the pressure, may be correlated with the signal. For example, the pressure in the conduit is often linearly correlated with a current under ideal conditions. A user may therefore send a signal of, for example, 4-20 milliamps (mA) to the I/P converter and expect that the fluid pressure be at a correlated pressure.

The I/P converters sometimes employ a flapper-nozzle arrangement to control the size of the opening. In such an arrangement the flapper presses against or is proximate to a nozzle with a gap. The size of the gap may be regulated to control the pressure of the fluid in the conduit. When the signal is zero (e.g., zero amps) and there is no fluid pressure, the flapper will be pressed against the nozzle by the weight of the flapper. However, it may be desirable for the flapper to not press against the nozzle when there is no fluid pressure and signal. For example, it may be desirable that zero current correlates with zero fluid pressure. To achieve this zero pressure to zero current correlation, the weight of the flapper is typically countered.

To counter the weight of the flapper, a spring or its equivalent is oftentimes coupled to the flapper. The spring's stiffness can be selected or designed to counter the weight of the flapper so, ideally, zero pressure correlates with the zero current when the flapper is horizontal with respect to gravity. Such an exemplary prior art I/P converter 10 with a spring 12 is shown in FIG. 1. As can be seen, a nozzle 14 is proximate a flapper 16 which is retained by a screw 18. The spring 12 is used to maintain a gap between the nozzle 14 and the flapper 16. That is, without the spring 12, the flapper 16 will press into the nozzle 14 in the absence of pressurized fluid. There may also be friction forces between the screw 18 and the flapper 16 that oppose movement of the flapper 16.

A problem with the I/P converter 10 is that the spring's 12 stiffness can depend on environmental factors such as the temperature, fatigue, corrosion, or the like. Also, the friction forces between the screw 18 and the flapper 16 impedes the movement of the flapper. These friction forces may also change due to the environmental factors. Moreover, other prior art I/P converters typically include bellows, retaining rings, or other parts that are also susceptible to environmental variables and friction forces. The I/P converter 10 is also unable to maintain the correlation between zero fluid pressure and zero current in various orientations. For example, turning the I/P converter 10 upside down causes a significant deviation in the fluid pressure and current correlation. The environmental variables, friction forces, and changes in orientation can therefore cause the correlation between the current and the fluid pressure (signal-pressure correlation) to change or drift over time. As a result, the actual fluid pressure output will differ from an expected or desired fluid pressure.

In addition, the flapper 16 can sometimes be deformed, for example, by the nozzle 14 when the flapper 16 touches the nozzle 14. The flapper might also not lie flat against the nozzle. These imperfections are problematic because the correlation between the gap size and fluid pressure may be a large number. That is, a small increase in the gap size can result in the large fluid pressure drop. Compounding this problem is that the gap between the flapper and nozzle is typically about 30 µm; a very small gap. Therefore, even small deformations or misalignment of the flapper 16 and the nozzle 14 can cause significant deviation in signal-pressure correlation. Moreover, manufacturing a flapper 16 that is within, for example, a few microns in tolerance is prohibitively expensive.

Accordingly, there is a need for I/P converters that do not rely on a material's stiffness to counter the weight of the flapper and have minimal frictional forces. There is also a need for I/P converters with flappers that are aligned and not easily deformed and yet still inexpensive to manufacture.

SUMMARY

A balance beam electro-pneumatic converter adapted to couple to a conduit with a fluid is provided. According to an embodiment, the balance beam electro-pneumatic converter comprises a nozzle adapted to fluidly couple to the conduit, and a flapper rotatably coupled to the nozzle via a pivot wherein the flapper is adapted to regulate a pressure of the fluid and balance about the pivot.

A method of forming a balance beam electro-pneumatic converter adapted to couple to a conduit carrying fluid is provided. The method comprises forming and adapting a nozzle to fluidly couple to the conduit, forming and rotatably coupling a flapper to the nozzle via a pivot and adapting the flapper to regulate a pressure of the fluid and balance about the pivot.

A method of operating a balance beam electro-pneumatic converter coupled to a conduit carrying a fluid is provided. The method comprises regulating a fluid pressure by applying a force to a flapper pivoting about a pivot when a nozzle is applying the fluid pressure to the flapper, and balancing the flapper about the pivot when the nozzle is not applying the fluid pressure to the flapper.

A method of calibrating an electro-pneumatic converter is provided. The method comprises adjusting a counter weight on a flapper, and detecting if the flapper is balanced.

Aspects

According to an aspect, a balance beam electro-pneumatic converter (100, 400) adapted to couple to a conduit with a fluid comprises a nozzle (184) adapted to fluidly couple to the conduit, and a flapper (130) rotatably coupled to the nozzle (184) via a pivot (140) wherein the flapper (130) is adapted to regulate a pressure of the fluid and balance about the pivot (140).

Preferably, the flapper (130) further comprises a first end that is proximate the nozzle (184), a second end on the other side of the pivot (140), and a counter weight (150) that is coupled to the second end of the flapper (130).

Preferably, the counter weight (150) is adapted to be positioned to balance the flapper (130) about the pivot (140).

Preferably, the pivot (140) comprises bearings (142*a,b*).

Preferably, the flapper (130) further comprises a shim (410) adapted to uniformly press against the nozzle (184).

Preferably, the balance beam electro-pneumatic converter (100, 400) further comprises a coil (160) that is coupled to the flapper (130) and wherein the coil (160) is adapted to carry a current to move the flapper (130) to or from the nozzle (184).

Preferably, the balance beam electro-pneumatic converter (100, 400) further comprises a magnet assembly (170) adapted to magnetically couple to the current in the coil (160).

According to an aspect, a method of forming a balance beam electro-pneumatic converter (100, 400) adapted to couple to a conduit carrying fluid, the method comprises forming and adapting a nozzle (184) to fluidly couple to the conduit, forming and rotatably coupling a flapper (130) to the nozzle (184) via a pivot (140) and adapting the flapper (130) to regulate a pressure of the fluid and balance about the pivot (140).

Preferably, the method of forming the flapper (130) comprises forming a first end proximate the nozzle (184), a second end on the other side of the pivot (140), and coupling a counter weight (150) to the second end of the flapper (130).

Preferably, the method of coupling the counter weight (150) to the second end of the flapper (130) comprises positioning the counter weight (150) to balance the flapper (130) about the pivot (140).

Preferably, the method of forming the pivot (140) comprises forming bearings (142a,b).

Preferably, the method of forming the flapper (130) further comprises forming a shim (410) adapted to uniformly press against the nozzle (184).

Preferably, the method of forming the balance beam electro-pneumatic converter (100, 400) further comprises forming and coupling a coil (160) to the flapper (130) and adapting the coil (160) to carry current to move the flapper (130) to and from the nozzle (184).

Preferably, the method of forming the balance beam electro-pneumatic converter (100, 400) further comprises forming a magnet assembly (170) and adapting the magnet assembly (170) to magnetically couple to the current in the coil (160).

According to an aspect, a method of operating a balance beam electro-pneumatic converter (100, 400) coupled to a conduit carrying a fluid comprises regulating a fluid pressure by applying a force to a flapper (130) pivoting about a pivot (140) when a nozzle (184) is applying the fluid pressure to the flapper (130), and balancing the flapper (130) about the pivot (140) when the nozzle (184) is not applying the fluid pressure to the flapper (130).

Preferably, the method of operating an electro-pneumatic converter (100, 400) further comprises balancing the flapper (130) with a counter weight (150) attached to the flapper (130).

Preferably, the method of operating a balance beam electro-pneumatic converter (100, 400) further comprises regulating a pressure of the fluid by moving the flapper (130) to and from a nozzle (184) with only a signal to the electro-pneumatic converter (100, 400).

According to an aspect, a method of calibrating an electro-pneumatic converter (100, 400) comprises adjusting a counter weight (150) on a flapper (130), and detecting if the flapper (130) is balanced.

Preferably, the method of detecting if the flapper (130) is balanced comprises a step (530a) of observing if the flapper (130) is moving slowly and proximate the nozzle (184).

Preferably, the method of detecting if the flapper (130) is balanced comprises a step (540b) of detecting if a force measured by a force gauge attached to the flapper (130) measures no force.

Preferably, the method of detecting if the flapper (130) is balanced comprises a step (540c) of observing if the flapper (130) is moving in response to a high frequency current and proximate a nozzle (184).

Preferably, the method of detecting if the flapper (130) is balanced comprises a step (540d) determining if a pressure of a fluid in a nozzle (184) correlates to a current applied to a coil (160) attached to the flapper (130).

BRIEF DESCRIPTION OF THE DRAWINGS

The same reference number represents the same element on all drawings. It should be understood that the drawings are not necessarily to scale.

FIGS. 5a-d show calibration procedures 500a-d for the balance beam electro-pneumatic converter 100, 400 according to an embodiment.

DETAILED DESCRIPTION

FIGS. 2-5d and the following description depict specific examples to teach those skilled in the art how to make and use the best mode of embodiments of a balance beam electro-pneumatic converter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the balance beam electro-pneumatic (I/P) converters. As a result, the embodiments described below are not limited to the specific examples described below, but only by the claims and their equivalents.

Figure 1:
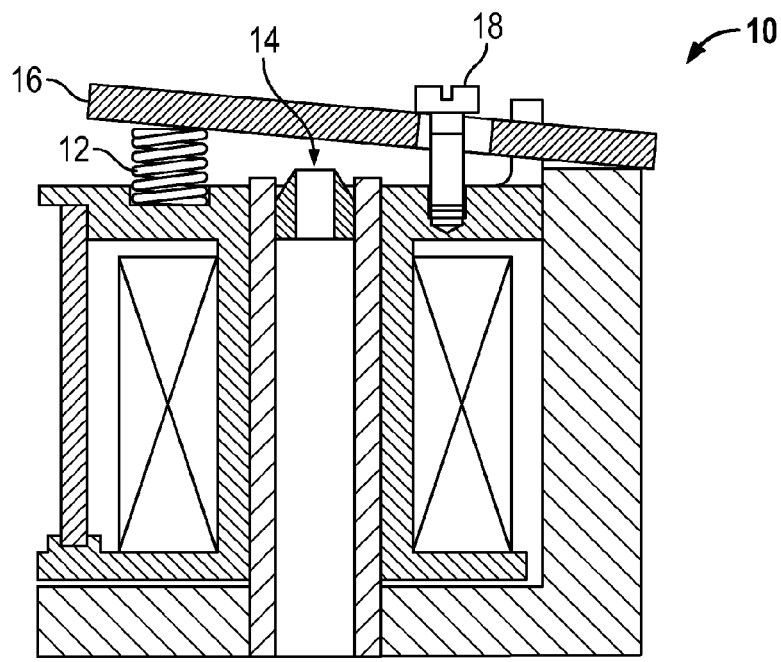
FIG. 1 shows a prior art electro-pneumatic converter.
Figure 2A:
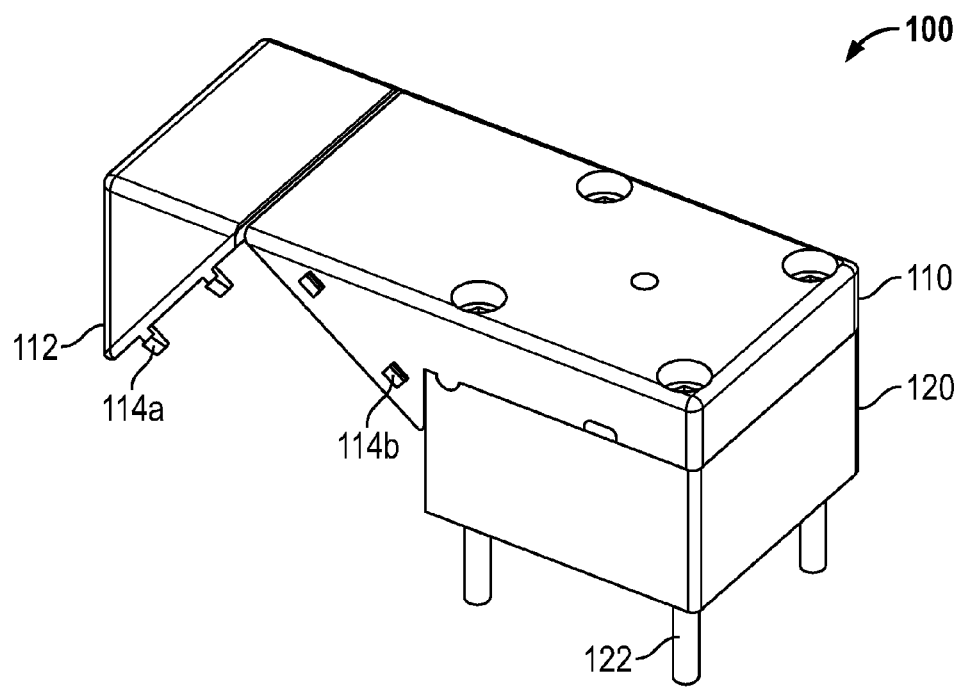
FIGS. 2a and 2b show perspective views of a balance beam I/P converter 100 according to an embodiment.
Figure 2B:
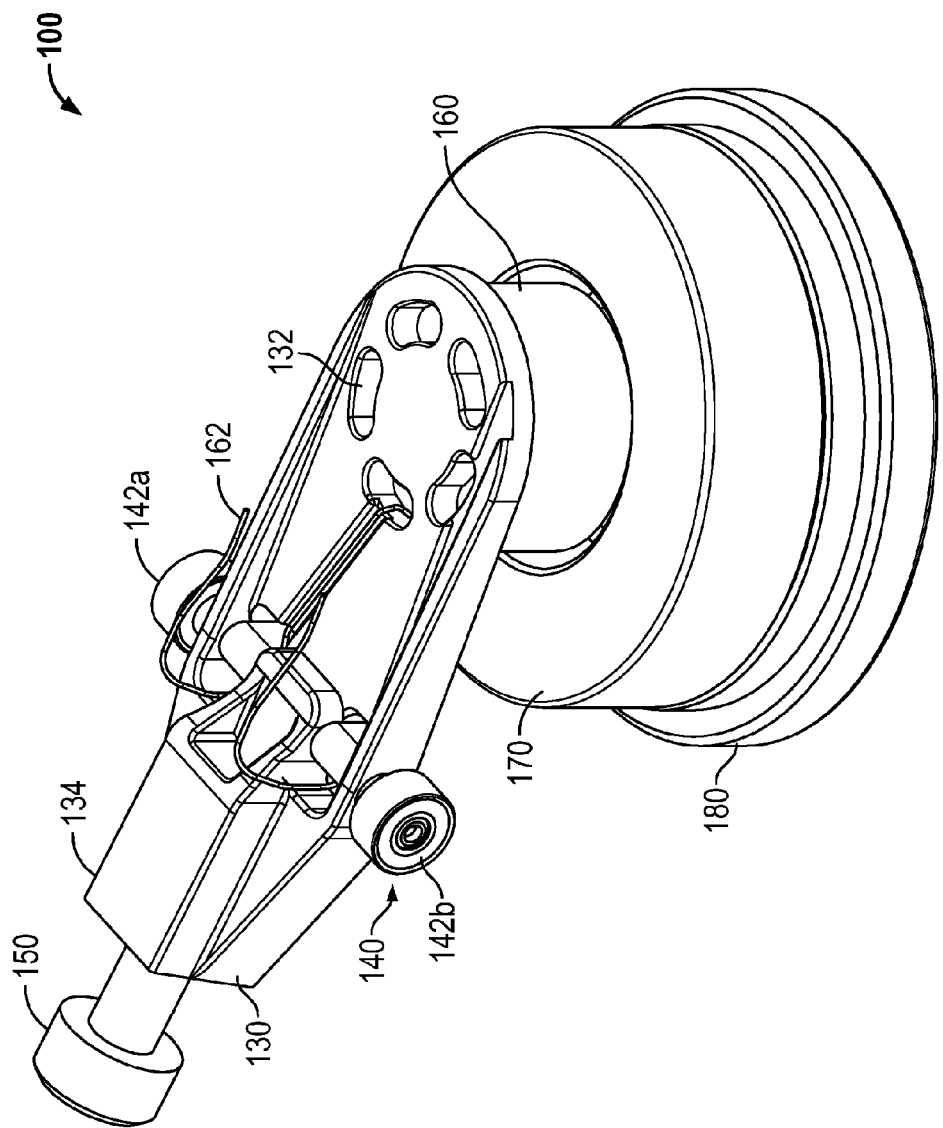

FIGS. 2a and 2b show perspective views of a balance beam I/P converter 100 according to an embodiment. As shown in FIG. 2a, the balance beam I/P converter 100 includes a cover 110 that is coupled to a body 120. The cover 110 is shown as a hatch 112 with four latches 114a. As will be described in more detail with reference to FIG. 2b, the hatch 112 covers a counter balance. The hatch 112 may rotate to enclose the counter balance and be held in place by the latches 114a coupling to openings 114b. The body 120 has four posts 122 that are mounted to a conduit (not shown) although any suitable means of coupling the body 120 to the conduit may be employed. The conduit may be fluidly coupled to the balance beam I/P converter as will be described in more detail in the following.

FIG. 2b shows the balance beam I/P converter 100 with the cover 110 and body 120 removed to show the inner parts of the balance beam I/P converter 100. As shown, a flapper 130 is rotatably coupled to a pivot 140. A counter weight 150 is coupled to the flapper 130. The flapper 130 is also coupled to a coil 160 that is disposed in a magnet assembly 170. The magnet assembly 170 may be magnetically coupled to a current in the coil 160 when the coil 160 is energized. The coil 160 can be disposed to surround a nozzle (described with reference to FIG. 3). The core 180 is coupled to the magnet assembly 170. The body 120 may hold the magnet assembly 170 and the core 180 together. As will be explained below, the flapper 130 can freely rotate about the pivot 140 to regulate the fluid pressure in the conduit.

The flapper 130 is comprised of a cast non-magnetic material, such as aluminum, so the flapper 130 is not magnetically coupled to the magnet assembly 170. However, any suitable material may be employed. The flapper 130 includes several openings 132 that are adapted to allow pressurized fluid to exhaust from the conduit. The openings 132 may be sized to reduce resistance to the exhaust. The flapper 130 also includes a truss 134 that is adapted to receive and hold a counter weight 150. The truss 134 may be adapted to increase the rigidity of the flapper 130.

The pivot 140 is a freely rotating pivot that is comprised of low friction roller bearings 142a,b coupled to a shaft (not shown) that traverses the flapper 130 although any suitable pivot may be employed. As shown, the pivot 140 includes the two roller bearings 142a,b on either side of the flapper 130. The roller bearings 142a,b may be coupled to the cover 110. Accordingly, the flapper 130 can freely rotate around the pivot 140 with minimal rotational friction. The pivot 140 includes a centerline that traverses the flapper 130.

The counter weight 150 is a threaded bolt that moves in and out of the truss 134 although any suitable counterweight may be employed. The depth of the counter weight 150 in the truss 134 can be selected so that a combined center of mass of the flapper 130, the counter weight 150, and the coil 160 is in or about the centerline of the pivot 140. As a result, the flapper 130 is balanced proximate to or resting slightly on the nozzle 184 when the coil 160 is not carrying current and there is no pressurized fluid in the conduit.

The coil 160 is comprised of a copper alloy selected for low electrical resistance although any suitable material may be employed. The coil 160 includes leads 162 that are coupled to a signal source such as a controller (not shown). The controller can therefore provide the current to the coil 160 via the leads 162. For example, the controller may provide electrical current that corresponds to a desired pressure in the conduit.

Figure 3:
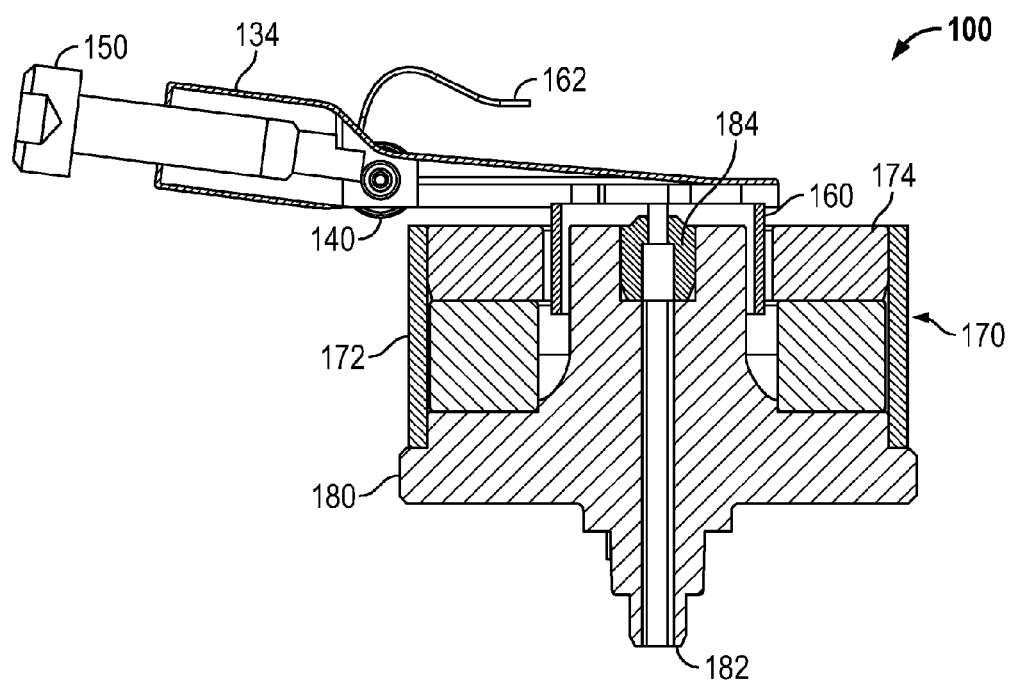
FIG. 3 shows a cross sectional side view of the balance beam I/P converter 100

FIG. 3 shows a cross sectional side view of the balance beam I/P converter 100 according to an embodiment. FIG. 3 illustrates additional details of the magnet assembly 170 and the nozzle 184 as well as how the flapper 130 is arranged near the nozzle 184.

The magnet assembly 170 is shown as comprised of a housing 172 that surrounds a magnet 174. The magnet 174 may be magnetically coupled to the current in the coil 160. The magnet 174 can be comprised of any suitable magnetic material. The magnet 174 can be configured such that a magnetic flux density is at a maximum where the coil 160 is disposed.

The core 180 may include a stem 182 that is adapted to couple to the conduit. The core 180 can also be coupled to the magnet assembly 170. The core 180 is comprised of iron although any suitable material may be employed. The material may be selected on the basis of, for example, the material's magnetic permeability. The nozzle 184 is comprised of brass although any suitable material may be employed. A portion of the core 180 and the nozzle 184 is disposed inside the coil 160. However, any suitable arrangement of the core 180, the nozzle 184, and the coil 160 may be employed. The nozzle 184 may be proximate to or touching the flapper 130 when the flapper 130 is balanced. The nozzle 184 can be formed as part of the core 180 or coupled to a portion of the core 180. As shown, the core 180 fluidly couples the pressurized fluid to the nozzle 184 so the flapper 130 may regulate the fluid pressure in the conduit. The core 180 also channels or directs the magnetic flux to the gap between the flapper 130 and the nozzle 184.

Although the combined center of mass of the flapper 130, the counter weight 150, and the coil 160 is described as being in the pivot 140 center line, the center of mass can be in any appropriate location. For example, the center of mass can be aligned such that the balance beam I/P converter 100 operates consistently and repeatably in various orientations. Accordingly, the balance beam I/P converter 100 may be calibrated in one orientation and used by the customer in a different orientation. Also, the flapper 130 and the counter weight 150 can be configured to not be perfectly balanced. For example, it may be desirable for the flapper 130 to rest on the nozzle 184 when the coil 160 is not energized and the conduit does not have pressurized fluid such as when the shim is being coupled to the flapper 130. Further, the center of mass can also include the mass of additional parts such as a shim as will be described in more detail in the following with reference to FIG. 4.

Figure 4:
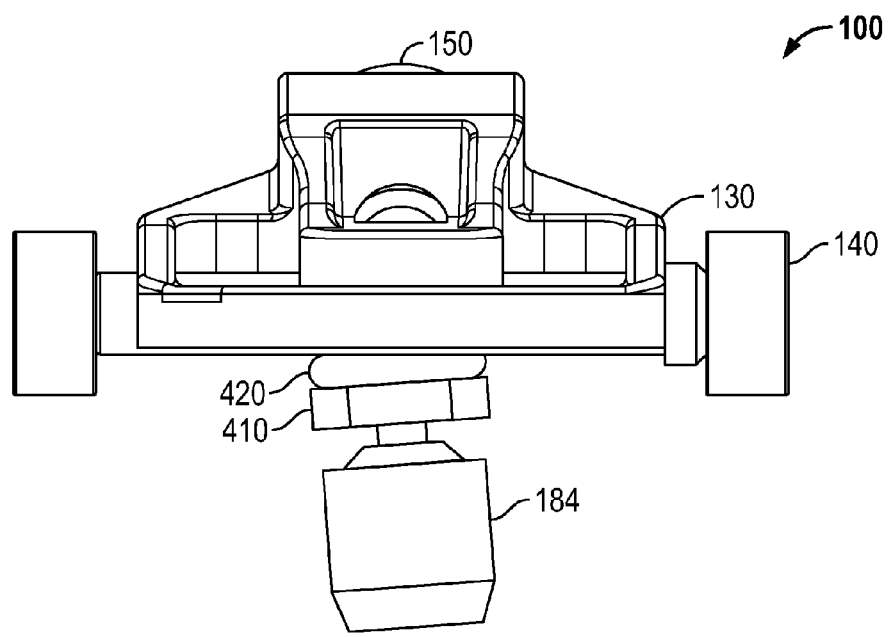
FIG. 4 shows a balance beam I/P converter 400 according to an embodiment.

FIG. 4 shows a balance beam I/P converter 400 according to an embodiment. The balance beam I/P converter 400 is similar to the balance beam I/P converter 100. However, a shim 410 is shown as coupled to the flapper 130 with a binder 420. The shim 410 can be comprised of a material that does not deform if pressed into the nozzle 184. The balance beam I/P converter 400 includes all the items described in the foregoing with reference to FIGS. 2-3. As shown in FIG. 4, the flapper 130 is rotatably coupled to the pivot 140. The flapper 130 is also coupled to the counter weight 150. The nozzle 184 is shown as proximate to the flapper 130 with the shim 410 and the binder 420 between the flapper 130 and the nozzle 184.

The shim 410 can be comprised of a material that is harder than the material comprising the flapper 130. For example, the shim 410 could be comprised of steel while the flapper 130 is comprised of aluminum. The shim 410 is shown as being disc shaped although any suitable shape may be employed. The binder 420 is an epoxy resin although any suitable means of coupling the shim 410 to the flapper 130 may be employed. As shown, the binder 420 is bonded with the shim 410 and the flapper 130. The binder 420 holds the shim 410 as the flapper 130 rotates about the pivot 140.

While the balance beam I/P converter 400 is being fabricated or formed, the flapper 130 may not be aligned with the top surface of the nozzle 184. That is, the flapper 130 may not lie flat against the nozzle 184 due to, for example, the nozzle 184 being tilted slightly. Accordingly, there is a gap between the flapper 130 and the nozzle 184 even though the flapper 130 is seated on the nozzle 184. In the embodiment shown in FIG. 4, the nozzle 184 is depicted as tilted in an exaggerated manner for illustration purposes. Also, there are a variety of ways the flapper 130 may not lie flat against the nozzle 184. For example, the flapper 130 could be slightly tilted or curved while the nozzle 184 is flat.

Regardless of cause of the misalignment, the shim 410 and the binder 420 can be added to the flapper 130 to ensure that the flapper 130 lies flat on the nozzle 184. The shim 410 and the binder 420 can be added while the balance beam I/P converter 400 is being fabricated. The shim 410 and the binder 420 may also be added after the balance beam I/P converter 400 has been shipped to the user or at any other appropriate time. The shim 410 is coupled to the flapper 130 by placing the shim 410 on the nozzle 184, placing the binder 420 on the shim 410 and applying a current to the coil 160 to press the flapper 130 into the binder 420. Pressing the flapper 130 into the nozzle 184 may flatten the shim 410 against the nozzle 184 while the binder 420 is curing. After the binder 420 has bonded to the flapper 130 and the shim 410, the current is shut off. Although the foregoing uses current to press the shim 140 into the nozzle 184, any suitable methods may be employed to couple the shim 410 to the flapper 130.

After the shim 410 and the binder 420 have been added to the flapper 130, the flapper 130 can press into the nozzle 184 without deforming. This ensures that the pressure exerted by the shim 410 is spread out over the surface of the nozzle 184 thereby reducing deformation of the shim 410 or the nozzle 184 as the flapper 130 presses the shim 410 into the nozzle 184. The gap between the shim 410 and the nozzle 184 may therefore repeatably and reliably correlate with the current in the coil 160.

As will be described in the following, the balance beam I/P converter 100, 400 can be calibrated so the flapper 130 is balanced about the pivot 140.

Calibration

FIGS. 5a-d show calibration procedures 500a-d for the balance beam electro-pneumatic converter 100, 400 according to an embodiment. Although there are a variety of ways to calibrate the balance beam I/P converter 100, 400, a visual calibration 500a, a force gauge calibration 500b, an oscillating calibration 500c, and an offset calibration 500d are shown as exemplary methods. The calibration procedures 500a-d each include steps of adjusting the counter weight 150 and determining if the flapper 130 is balanced. Specific examples of these steps are described in the following.

Figure 5A:
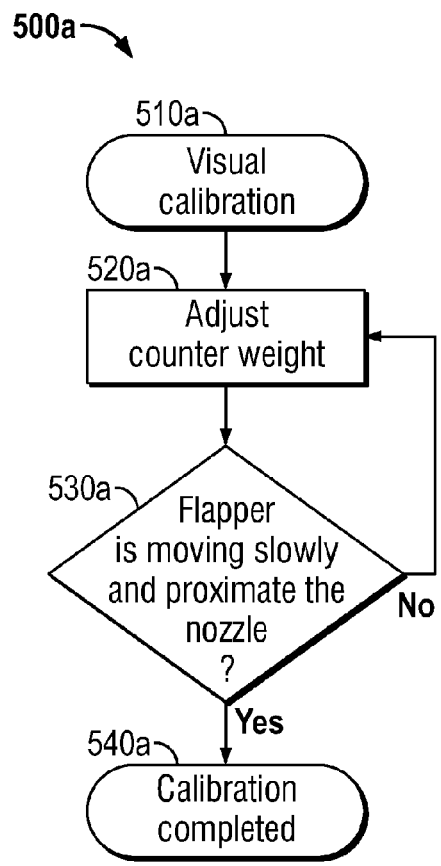

With reference to FIG. 5a, the visual calibration 500a begins with step 510a which is followed by step 520a wherein a user may open the hatch 112 described with reference to FIG. 2a. A wrench or any other appropriate tool is used to adjust the position of the counter weight 150. In step 530a, the user observes the flapper 130, for example, through the opened hatch 112. The user can observe if the flapper 130 is resting on or proximate to the nozzle 184. The user may also observe if the flapper 130 is moving slowly about this position. If the flapper 130 is moving slowly about this position, the counter weight 150 may be in a position that balances the flapper 130 about the pivot 140. Therefore, the balance beam I/P converter 100, 400 can be calibrated thereby concluding the visual calibration 500a in step 540a.

Figure 5B:
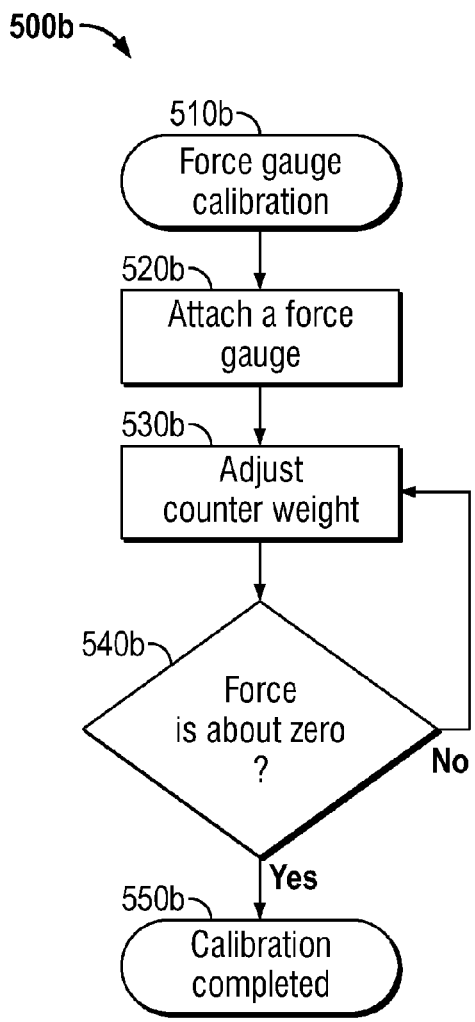

With reference to FIG. 5b, the force gauge calibration 500b begins with step 510b which is followed by step 520b wherein a force gauge (not shown) is attached to the flapper 130. In step 530b, the user may adjust the counter weight in a manner similar to that described with reference to FIG. 5a. If the force gauge shows the force is not zero, the user can further adjust the counter weight 150 in the step 530b. If the flapper 130 is balanced, the force gauge may be about show no force is present. If the force is zero, then the force gauge calibration 500b concludes with step 550b.

With reference to FIG. 5c, the oscillation calibration 500c begins with step 510c which is followed by step 520c wherein a user may apply a high frequency current through the coil 160. This may cause the flapper 130 to move or vibrate if the flapper 130 is not pressed against the nozzle 184 due to, for example, being unbalanced. In step 540c, the user may determine if the flapper 130 is proximate to the nozzle 184. If the flapper 130 is moving and is proximate the nozzle 184, then the oscillation calibration of the balance beam I/P converter 100, 400 concludes with step 530c.

With reference to FIG. 5d, the offset calibration 500d begins with step 510d wherein the balance beam I/P converter 100, 400 is coupled to the conduit with pressurized fluid. After step 510d, the user applies a known current to the coil 160 in step 520d to form a force that opposes the fluid pressure applied to the flapper by the nozzle 184. If the flapper 130 is not balanced, the known current and the pressure of the fluid may not be correlated. The user may adjust the counter weight 150 to balance the flapper 130 until the pressure correlates with the current. After the desired pressure is obtained, the offset calibration 500d concludes in step 560d.

Once the flapper 130 is calibrated, the balance beam I/P converter 100, 400 may accurately and reliably regulate the pressure of the fluid in the conduit as will be described in the following.

Operation

In operation, the balance beam I/P converter 100, 400 may be coupled to the conduit. In the balance beam I/P converter 100, the counter weight 150 may be positioned in the truss 134 such that the flapper 130 is balanced about the pivot 140. When there is no pressurized fluid in the conduit and no current flowing through the coil 160, the flapper 130 may rest on or proximate to the nozzle 184 with little or no pressure. Accordingly, a zero signal (e.g., zero amps) therefore correlates with zero pressure in the balance beam I/P converter 100.

As shown in FIG. 3, the flapper 130 can rotate about the pivot 140 to form a gap when the nozzle 184 applies pressurized fluid to the flapper 130. That is, due to the flapper 130 being balanced, very small amounts of fluid pressure may be sufficient to form a gap when there is no current in the coil 160. The controller described in the foregoing provides the current to the coil 160. The current forms a magnetic field that couples to the magnet assembly 170's magnetic field to press the flapper 130 towards the nozzle 184. The gap therefore become smaller than the gap that was present when there was no current in the coil 160. The current can vary to allow the gap between the flapper 130 and the nozzle 184 to vary.

Due to the flapper 130 being balanced, the current in the coil 160 can be proportional to the correlating fluid pressure Also, once balanced, the signal-pressure correlation does not change due to, for example, temperature variation or the like. For example, if the flapper 130 increases in temperature, the flapper 130 may expand slightly. However, the force that is applied by the flapper 130 to regulate the fluid pressure only depends on the current in the coil 160. Also, the shim 410 can prevent the deformation of the flapper 130 or the nozzle 184. Accordingly, the signal-pressure correlation will not vary due to deformation of the flapper 130 or the nozzle 184. Also, the flapper 130 may not be coupled to other items such as a bellows that may also affect the flapper 130. For example, in the embodiment shown in FIG. 3, the only forces that act on the flapper 130 during operation is the pressure from the pressurize fluid and the force from the current in the coil. The pivot 140 is freely rotating and therefore exerts minimal to zero rotational friction force on the flapper 130.

The embodiments described above provide a balance beam I/P converter 100, 400. As explain in the foregoing, the balance beam I/P converter 100, 400 may reduce or eliminate the effect that environmental factors and friction may have on the flapper 130. The balance beam I/P converter 100, 400 is also able to operate in various orientations. The signal-pressure correlation may therefore be accurate and repeatable. The balance beam I/P converter 100, 400 may also be less expensive than prior art I/P converters. For example, the balance beam I/P converter 100, 400 may, for example, be calibrated at room temperature in an arbitrary orientation. Later, the same balance beam I/P converter 100, 400 may be installed on a conduit in a warmer environment without an additional calibration and in a different orientation. This is in contrast to prior art I/P converters that rely on spring constants which may require calibration after being installed on a conduit and an orientation that is the same as when calibrated. Also, the balance beam I/P converter 400 that includes the shim 410 may operate reliably even if the flapper 130 presses into the nozzle 184. The shim 410 may also reduce manufacturing costs associated with high precision manufacturing processes.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. For example, although the foregoing describes balance beam I/P converters, embodiments that do not use current may fall within the scope of the claims. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other electro-pneumatic converters, and not just to the embodiments described above and shown in the accompanying figures. Accordingly, the scope of the embodiments described above should be determined from the following claims.

We claim:

1. A balance beam electro-pneumatic converter (100, 400) adapted to couple to a conduit with a fluid, comprising:
   a nozzle (184) adapted to fluidly couple to the conduit; and
   a flapper (130) rotatably coupled to the nozzle (184) via a pivot (140) wherein the flapper (130) is adapted to regulate a pressure of the fluid and balance about the pivot (140), wherein the flapper (130) can freely rotate about the pivot (140), and wherein the balance beam electro-pneumatic converter (100, 400) further comprises a coil (160) that is coupled to the flapper (130) so as to move with the flapper (130) and such that the coil (160) is disposed to surround the nozzle (184) and wherein the coil (160) is adapted to carry a current to move the flapper (130) to or from the nozzle (184).

2. The balance beam electro-pneumatic converter (100, 400) of claim 1 wherein the flapper (130) further comprises a first end that is proximate the nozzle (184), a second end on the other side of the pivot (140), and a counter weight (150) that is coupled to the second end of the flapper (130).

3. The balance beam electro-pneumatic converter (100, 400) of claim 2 wherein the counter weight (150) is adapted to be positioned to balance the flapper (130) about the pivot (140).

4. The balance beam electro-pneumatic converter (100, 400) of claim 1 wherein the pivot (140) comprises bearings (142a,b).

5. The balance beam electro-pneumatic converter (100, 400) of claim 1 wherein the flapper (130) further comprises a shim (410) adapted to uniformly press against the nozzle (184).

6. The balance beam electro-pneumatic converter (100, 400) of claim 1 further comprising a magnet assembly (170) adapted to magnetically couple to the current in the coil (160).

7. A method of forming a balance beam electro-pneumatic converter (100, 400) adapted to couple to a conduit carrying fluid, the method comprising:
   forming and adapting a nozzle (184) to fluidly couple to the conduit; and
   forming and rotatably coupling a flapper (130) to the nozzle (184) via a pivot (140) and adapting the flapper (130) to regulate a pressure of the fluid and balance about the pivot (140), wherein the flapper (130) can freely rotate about the pivot (140), and wherein the method further comprises forming and coupling a coil (160) to the flapper (130) so as to move with the flapper (130) and such that the coil (160) is disposed to surround the nozzle (184) and adapting the coil (160) to carry current to move the flapper (130) to and from the nozzle (184).

8. The method of forming the balance beam electro-pneumatic converter (100, 400) of claim 7, wherein forming the flapper (130) comprises forming a first end proximate the nozzle (184), a second end on the other side of the pivot (140), and coupling a counter weight (150) to the second end of the flapper (130).

9. The method of forming the balance beam electro-pneumatic converter (100, 400) of claim 8, wherein coupling the counter weight (150) to the second end of the flapper (130) comprises positioning the counter weight (150) to balance the flapper (130) about the pivot (140).

10. The method of forming the balance beam electro-pneumatic converter (100, 400) of claim 7, wherein forming the pivot (140) comprises forming bearings (142a,b).

11. The method of forming the balance beam electro-pneumatic converter (100, 400) of claim 7, wherein forming the flapper (130) further comprises forming a shim (410) adapted to uniformly press against the nozzle (184).

12. The method of forming the balance beam electro-pneumatic converter (100, 400) of claim 7 further comprises forming a magnet assembly (170) and adapting the magnet assembly (170) to magnetically couple to the current in the coil (160).

13. A method of operating a balance beam electro-pneumatic converter (100, 400) coupled to a conduit carrying a fluid, comprising:
   regulating a fluid pressure by applying a force to a flapper (130) pivoting about a pivot (140) when a nozzle (184) is applying the fluid pressure to the flapper (130); and
   balancing the flapper (130) about the pivot (140) when the nozzle (184) is not applying the fluid pressure to the flapper (130), wherein the flapper (130) can freely rotate about the pivot (140), wherein the balance beam electro-pneumatic converter (100, 400) further comprises a coil (160) that is coupled to the flapper (130) so as to move with the flapper (130) and such that the coil (160) is disposed to surround the nozzle (184) and wherein the coil (160) is adapted to carry a current to move the flapper (130) to or from the nozzle (184).

14. The method of operating an electro-pneumatic converter (100, 400) of claim 13 further comprises balancing the flapper (130) with a counter weight (150) attached to the flapper (130).

15. The method of operating a balance beam electro-pneumatic converter (100, 400) of claim 13 further comprises regulating a pressure of the fluid by moving the flapper (130) to and from the nozzle (184) with only a signal to the electro-pneumatic converter (100, 400).

* * * * *

UNITED STATES PATENT AND TRADEMARK OFFICE
CERTIFICATE OF CORRECTION

| | |
|---|---|
| PATENT NO. | : 10,001,145 B2 |
| APPLICATION NO. | : 15/022683 |
| DATED | : June 19, 2018 |
| INVENTOR(S) | : Tarik Saneecharaun, Pete Olley and David Matthew Thompson |

It is certified that error appears in the above-identified patent and that said Letters Patent is hereby corrected as shown below:

On the Title Page

Item (72) Inventors: replace "David Matthew Tompson" with --David Matthew Thompson--

Signed and Sealed this
Eleventh Day of June, 2019

Andrei Iancu
*Director of the United States Patent and Trademark Office*